US 8,516,888 B2

(12) United States Patent
Honda et al.

(10) Patent No.: US 8,516,888 B2
(45) Date of Patent: Aug. 27, 2013

(54) ANGULAR VELOCITY SENSOR AND METHOD OF MANUFACTURING THE SAME

(75) Inventors: Junichi Honda, Miyagi (JP); Teruo Inaguma, Miyagi (JP); Tetsuya Shibayama, Miyagi (JP)

(73) Assignee: Sony Corporation, Tokyo (JP)

( * ) Notice: Subject to any disclaimer, the term of this patent is extended or adjusted under 35 U.S.C. 154(b) by 514 days.

(21) Appl. No.: 12/491,915

(22) Filed: Jun. 25, 2009

(65) Prior Publication Data

US 2010/0000322 A1    Jan. 7, 2010

(30) Foreign Application Priority Data

Jul. 4, 2008    (JP) ................................ 2008-175445

(51) Int. Cl.
*G01C 19/00*    (2013.01)
(52) U.S. Cl.
USPC ........................................ 73/504.16
(58) Field of Classification Search
USPC ............ 73/504.16, 504.01, 504.15, 514.02, 73/514.15, 514.34; 29/830
See application file for complete search history.

(56) References Cited

U.S. PATENT DOCUMENTS

| | | | | |
|---|---|---|---|---|
| 5,056,366 A | * | 10/1991 | Fersht et al. | 73/504.15 |
| 5,396,144 A | * | 3/1995 | Gupta et al. | 310/370 |
| 5,420,548 A | * | 5/1995 | Nakajima | 331/65 |
| 5,426,970 A | * | 6/1995 | Florida et al. | 73/1.37 |
| 5,444,639 A | * | 8/1995 | White | 708/300 |
| 5,559,291 A | * | 9/1996 | Hasegawa | 73/504.12 |
| 5,757,107 A | * | 5/1998 | Wakatuki et al. | 310/370 |
| 5,796,000 A | * | 8/1998 | Fujiu et al. | 73/504.15 |
| 5,824,900 A | * | 10/1998 | Konno et al. | 73/504.16 |
| 5,912,528 A | * | 6/1999 | Kumada | 310/353 |
| 5,987,987 A | * | 11/1999 | Watarai | 73/504.16 |
| 6,010,919 A | * | 1/2000 | Matsuhiro et al. | 438/52 |
| 6,119,518 A | * | 9/2000 | Itou et al. | 73/504.16 |
| 6,177,756 B1 | * | 1/2001 | Yachi et al. | 310/370 |
| 6,418,789 B1 | * | 7/2002 | Ishitoko et al. | 73/504.12 |
| D516,500 S | * | 3/2006 | Ogura | D13/101 |
| D520,940 S | * | 5/2006 | Ogura | D13/101 |
| 7,188,525 B2 | * | 3/2007 | Machida et al. | 73/504.16 |
| 7,387,025 B2 | * | 6/2008 | Nozoe | 73/504.16 |

(Continued)

FOREIGN PATENT DOCUMENTS

JP    06-281665    10/1994
JP    2000-321072    11/2000

(Continued)

OTHER PUBLICATIONS

Nozoe (English Translation of International Patent Application Publication WO2005078389).*

(Continued)

*Primary Examiner* — Peter Macchiarolo
*Assistant Examiner* — Samir M Shah
(74) *Attorney, Agent, or Firm* — K&L Gates LLP

(57) ABSTRACT

Disclosed is an angular velocity sensor. The angular velocity sensor includes a first layer, a piezoelectric layer, and a second layer. The first layer has a first main surface and a second main surface, and includes a vibrator portion and a base portion that supports the vibrator portion. The piezoelectric layer is formed on the first main surface of the first layer. The second layer is integrally bonded to the base portion on a side of the second main surface of the first layer.

16 Claims, 10 Drawing Sheets

(56) References Cited

U.S. PATENT DOCUMENTS

| | | | |
|---|---|---|---|
| 7,400,078 B2 | 7/2008 | Takahashi et al. | |
| 8,117,916 B2 * | 2/2012 | Okamoto et al. | 73/504.16 |
| 2003/0222947 A1 * | 12/2003 | Tomozawa et al. | 347/68 |
| 2005/0066727 A1 * | 3/2005 | Fujimoto et al. | 73/504.16 |
| 2009/0050990 A1 * | 2/2009 | Aono et al. | 257/415 |

FOREIGN PATENT DOCUMENTS

| | | |
|---|---|---|
| JP | 2006-030062 | 2/2006 |
| JP | 2007-043054 | 2/2007 |
| JP | 200743054 | 2/2007 |
| JP | 2007-285879 | 11/2007 |

OTHER PUBLICATIONS

Japanese Office Action for corresponding JP2008-285879 issued on Aug. 10, 2010.

Japanese Office Action for corresponding JP2008-175445 issued on May 11, 2010.

* cited by examiner

FIG.3A
FIG.3B
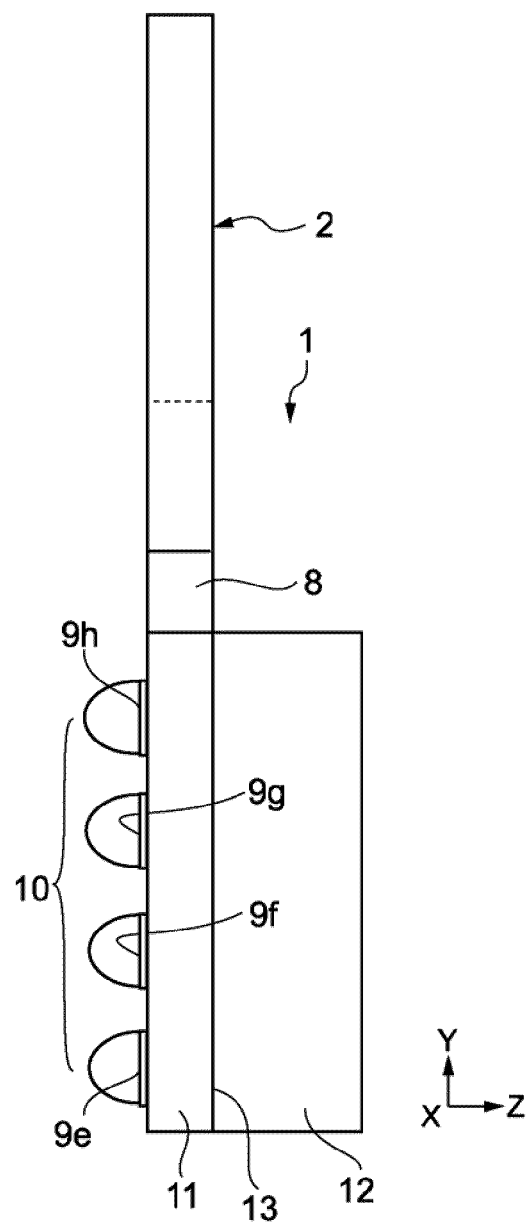
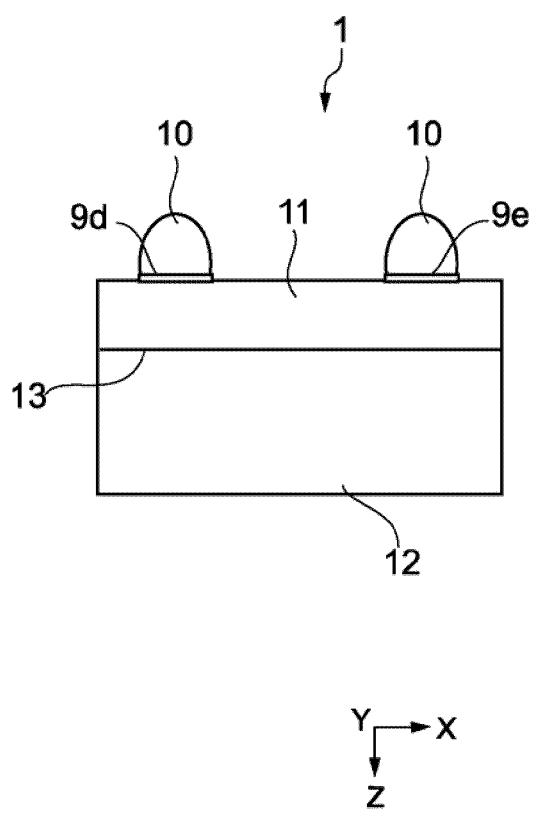

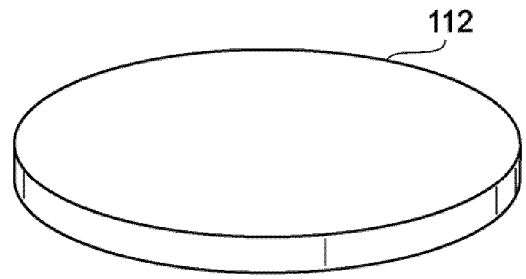 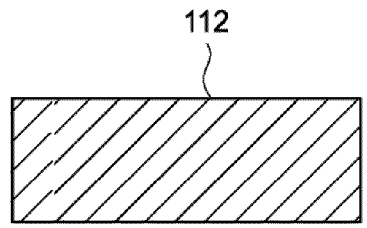
FIG.4A  FIG.4B
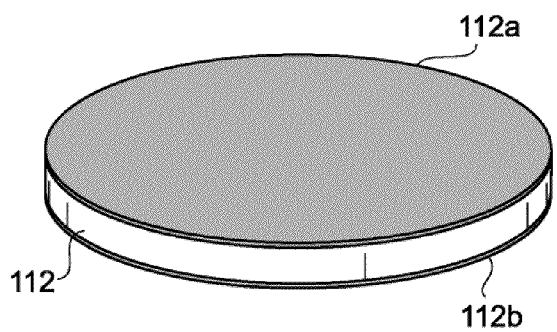 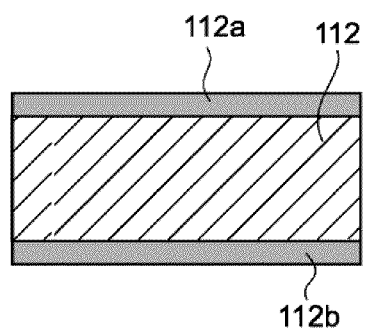
FIG.5A  FIG.5B
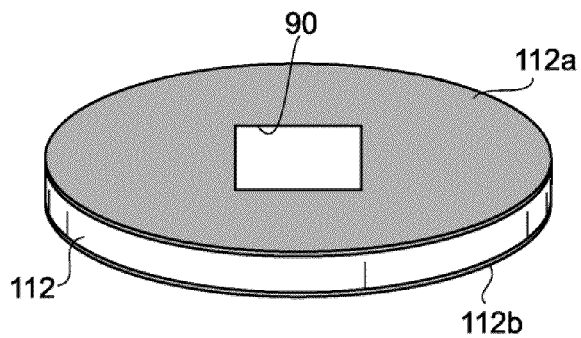 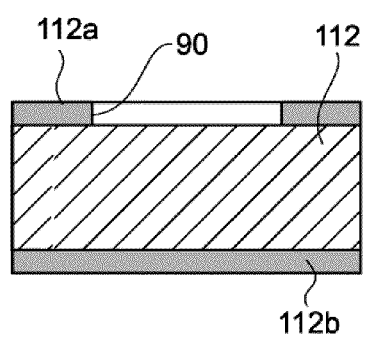
FIG.6A  FIG.6B

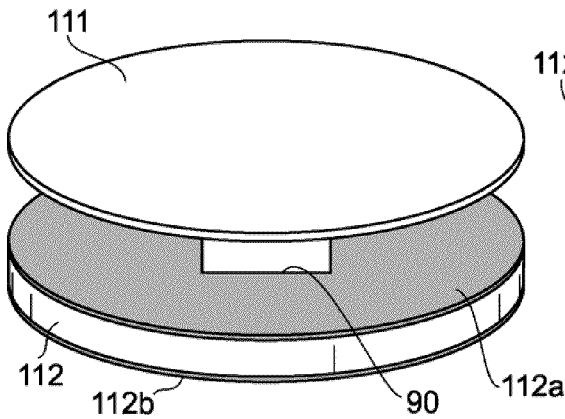
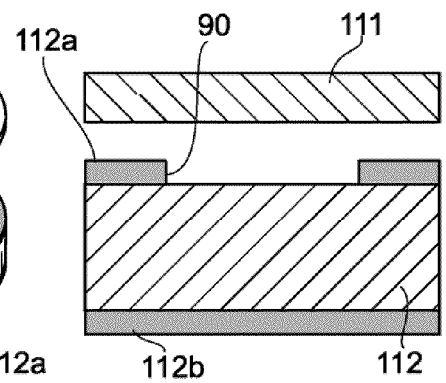
FIG.7A　　　　　FIG.7B
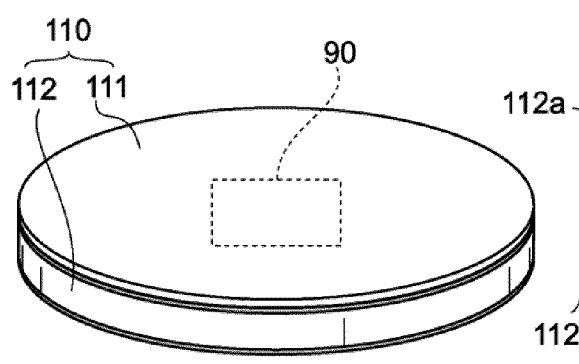
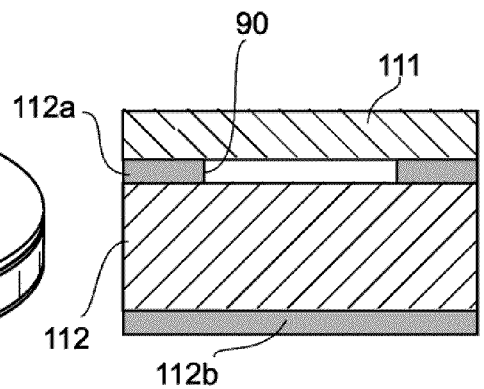
FIG.8A　　　　　FIG.8B
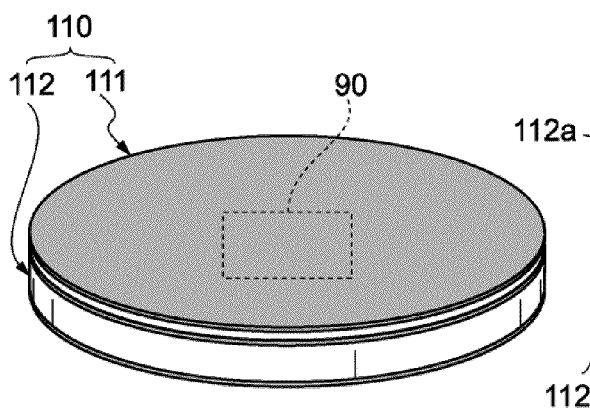
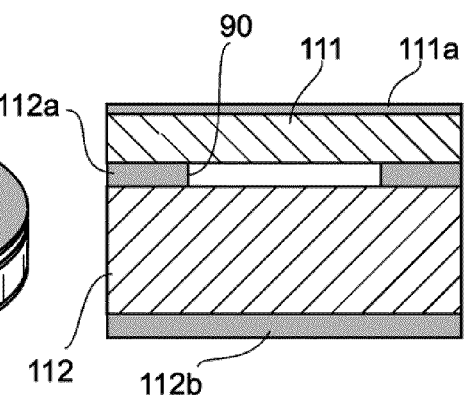
FIG.9A　　　　　FIG.9B

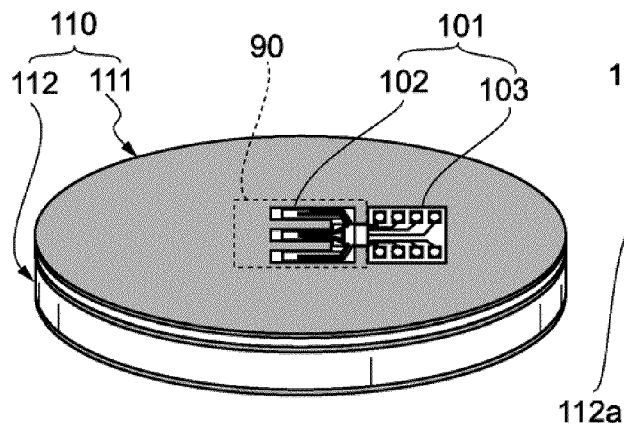
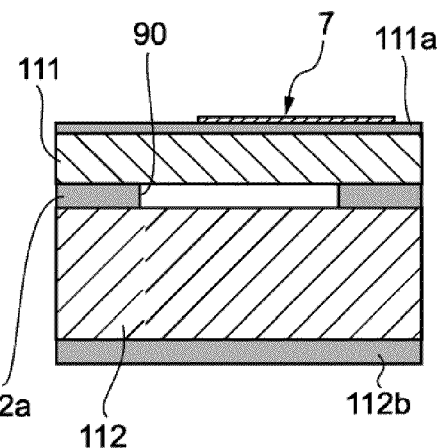
FIG.10A  　　　　　FIG.10B
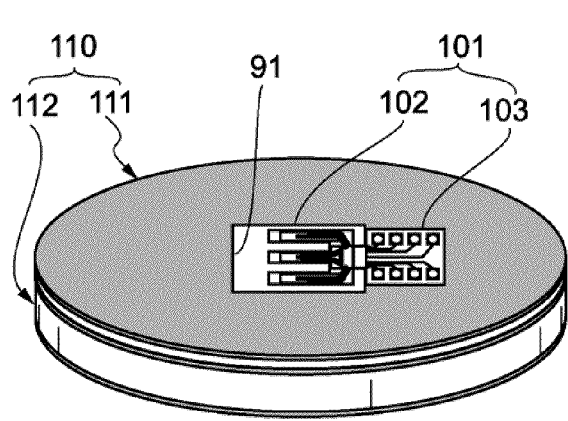
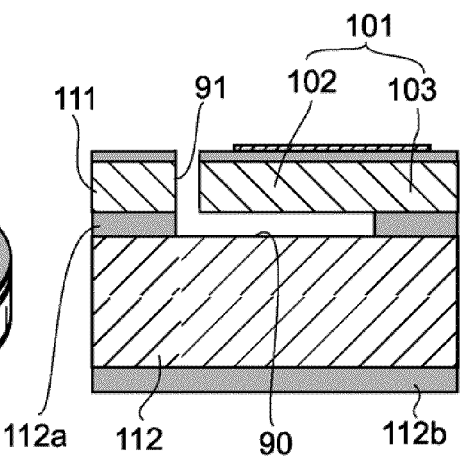
FIG.11A  　　　　　FIG.11B

ANGULAR VELOCITY SENSOR AND METHOD OF MANUFACTURING THE SAME

CROSS REFERENCES TO RELATED APPLICATIONS

The present application claims priority to Japanese Priority Patent Application JP 2008-175445 filed in the Japan Patent Office on Jul. 4, 2008, the entire contents of which is hereby incorporated by reference.

BACKGROUND

The present application relates to an angular velocity sensor used for, for example, a hand jiggle detection when a video camera is used, an operation detection in a virtual reality apparatus, and a direction detection in a car navigation system, and to a method of manufacturing the same.

In related art, as a consumer angular velocity sensor, there is being used a so-called vibrating gyro sensor (hereinafter, referred to as angular velocity sensor) that detects an angular velocity by detecting Coriolis force generated due to an influence of an angular velocity by using a piezoelectric element or the like while a cantilever or double-end-beam vibrator, a tuning fork vibrator, and the like are vibrated at a predetermined resonant frequency.

An angular velocity sensor has advantages in its simple structure, short start-up time, and low-cost manufacturability. Electronic apparatuses such as a video camera, a virtual reality apparatus, and a car navigation system are equipped with an angular velocity sensor, which is used as a sensor for a hand jiggle detection, an operation detection, a direction detection, or the like.

Along with miniaturization and enhanced performance of an electronic apparatus equipped with an angular velocity sensor, there is a demand for an angular velocity sensor to be reduced in size and enhanced in performance. Specifically, for a multifunctional electronic apparatus, an angular velocity sensor is required to be mounted on a single substrate in combination with various sensors used for other purposes, to realize the size reduction.

In related art, generally, a gyro sensor having a structure in which a piezoelectric material such as PZT (lead zirconate titanate) is processed into flakes by machining, retained by a spring or the like, and vibrated by applying an electrical signal has been used, but is difficult to be miniaturized.

In view of this, the following technique has been developed. A single-crystalline substrate made of, for example, Si (silicon) is used, a piezoelectric material such as PZT (lead zirconate titanate) is formed into a thin film on the substrate by a sputtering method or a sol-gel method, and an etching process is performed on a predetermined part of the substrate, thereby producing a plurality of vibrators each of which is a quadrangular prism and has a rectangular cross-section from the single substrate at the same time (see, for example, Japanese Patent Application Laid-open No. 2007-43054, hereinafter, referred to as Patent Document 1).

SUMMARY

In the angular velocity sensor in which the thin film made of the piezoelectric material is formed on the Si substrate, a difference between a vertical resonant frequency and a lateral resonant frequency of the vibrator significantly affects a sensitivity of the gyro sensor. Therefore, it is necessary to rigorously control a thickness and width of a vibrating arm, to thereby control the difference in the frequencies to fall within a range of about 100 to 400 Hz.

In related art, by using a difference in etching rates generated depending on a crystal orientation of an exposed surface of a wafer (Si substrate), a depressed portion having an approximately truncated quadrangular pyramid shape is formed by a wet etching method, and a thickness of a flat portion on a bottom surface of the depressed portion is set as the thickness of the vibrating arm of the gyro sensor (see, Patent Document 1).

In the wet etching method, however, there are a lot of factors that cause a variation in etching rate, such as an etching temperature, so a problem still remains in process accuracy. Specifically, for example, when the substrate is increased in size, thickness variations in a plane of the wafer are markedly caused, which may generate a sensitivity distribution of components depending on positions on the plane of the wafer and thus may cause reduction in yield.

Further, in the wet etching method, immersion in an alkaline solution for a long time is required. Therefore, if the etching process is performed after a functional layer such as the piezoelectric layer is formed, the functional layer may be adversely affected. In addition, if the etching process is performed before the functional layer is formed, the wafer may cracks during the process because a mechanical strength of the wafer is decreased.

On the other hand, a method of producing an angular velocity sensor by using a thin wafer processed in a thickness of a vibrating arm can also be considered. However, when the thickness of the vibrating arm is, for example, 100 µm, the strength required for the wafer is significantly insufficient. Therefore, a handling ability of the wafer may be impaired, or the wafer may cracks when handled.

In view of the above-mentioned circumstances, it is desirable to provide an angular velocity sensor that is excellent in sensitivity characteristics and realizes improvement of productivity, and a manufacturing method thereof.

According to an embodiment, there is provided an angular velocity sensor including a first layer, a piezoelectric layer, and a second layer.

The first layer has a first main surface and a second main surface, the first layer including a vibrator portion and a base portion that supports the vibrator portion. The piezoelectric layer is formed on the first main surface of the first layer. The second layer integrally bonded to the base portion on a side of the second main surface of the first layer.

With the structure of the angular velocity sensor, the second layer functions as a support layer that supports the first layer. Therefore, the first layer can be formed of a relatively thin substrate, for example, a substrate that has the same thickness as the vibrator portion. In this case, it is possible to provide the angular velocity sensor which is excellent in sensitivity characteristics and in which the thickness of the vibrator portion does not depend on the in-plane position of the substrate.

The angular velocity sensor may include a first electrode connected to a reference potential, a second electrode to which a drive signal is input, a piezoelectric layer disposed between the first and second electrodes, and a third electrode for Coriolis force detection.

The second layer may be thicker than the first layer. With this structure, the function of the second layer as the support layer for the first layer can be improved.

The first layer and the second layer each may be made of a silicon substrate. Further, a bonding layer between the first layer and the second layer may be made of a silicon oxide layer. With this structure, it is possible to highly productively manufacture the angular velocity sensor excellent in sensitivity characteristics with a substrate bonding technique, called SOI (Silicon On Insulator).

The angular velocity sensor may further include a plurality of terminal portions that are formed on the base portion on a side of the first main surface and connected to an external circuit. In this case, the second layer is bonded to the second main surface over an area corresponding to formation positions of the plurality of terminal portions.

With this structure, by the reinforcement function of the second layer, the base portion can be prevented from being fractured when mounted, when the angular velocity sensor is mounted on the external circuit with a flip chip structure.

The vibrator portion may include three arm portions that extend in parallel to one another. Of course, the number of arm portions is not limited to this, and may be one (cantilever or double-end-beam type) or two (tuning fork type). In the case where the vibrator portion is formed of the three arm portions, the piezoelectric layer can be formed on the respective arm portions similarly. Further, it is possible to modify the arrangement as appropriate so that a central arm portion is provided with an electrode for piezoelectric drive and outer two arm portions are provided with electrodes for angular velocity detection, for example.

The second layer may include a shielding portion that shields the vibrator portion. The shielding portion may include, on a surface opposed to the vibrator portion, a concave part in which a vibration space of the vibrator portion is formed.

With this structure, it is possible to obtain an effect of protecting the vibrator portion by the second layer while ensuring the vibration space of the vibrator portion.

According to another embodiment, there is provided an angular velocity sensor manufacturing method. The angular velocity sensor manufacturing method includes forming an insulation layer on a first substrate, forming, on the insulation layer, an opening from which the first substrate is exposed, bonding a second substrate to the first substrate with the insulation layer being sandwiched, forming a piezoelectric layer on a main surface of one of the first substrate and the second substrate, forming a vibrator portion in an area on the main surface which corresponds to a formation position of the opening, and forming an outline of a base portion that supports the vibrator portion by dicing the first substrate and the second substrate.

In the angular velocity manufacturing method, the angular velocity sensor is manufactured by using the substrate obtained by bonding the first substrate and the second substrate with each other. With this structure, the thickness of the substrate necessary for handling can be easily ensured. Further, if the substrate on a side on which the vibrator portion and the base portion are formed is made to be thin, the other substrate functions as the support layer therefor, with the result that the substrate can be prevented from cracking. Thus, the productivity can be improved. In addition, the vibration space of the vibrator portion can be secured within the opening in the insulation layer. Therefore, the vibration space can be formed without directly putting the vibrator into an etching solution, and the piezoelectric layer can be prevented from being adversely affected by the use of the etching solution.

In the angular velocity sensor manufacturing method, the second substrate may be thinner than the first substrate, and the main surface may be a main surface of the second substrate.

For example, as the second substrate, a substrate having the same thickness as the vibrator portion after manufactured can be used. In this case, it is possible to provide the angular velocity sensor which is excellent in the sensitivity characteristics and in which the thickness of the vibrator portion does not depend on the in-plane position of the substrate.

It should be noted that as another method of setting the second substrate to have the same thickness as the vibrator portion, after bonding to the first substrate and before forming the piezoelectric layer, the surface of the second substrate as the main surface is polished, thereby processing the second substrate so as to have a predetermined thickness.

The step of forming the insulation layer may include forming a silicon oxide layer on the first substrate by performing a heating process on the first substrate as a silicon substrate in an oxygen atmosphere.

As a result, the insulation layer (silicon oxide layer) having excellent layer quality such as crystallinity can be formed on the first substrate.

The step of forming the vibrator portion may include forming, in the second substrate, an etching groove that corresponds to an outline of the vibrator portion by a dry etching process.

As a result, the outline of the vibrator portion can be processed with high accuracy, and the vibrator portion whose thickness and width are desirable can be formed.

The angular velocity sensor manufacturing method may further includes forming, in the first substrate, a through hole through which the vibrator portion is exposed to outside from the opening.

As a result, a space for thickness of the vibrator portion can be reliably ensured.

The step of forming the through hole includes forming, in the first substrate, an etching groove that corresponds to an outline of the opening by the dry etching process.

As a result, the through hole can be efficiently formed as compared to a case where a formation area of the through hole is etched and removed.

The angular velocity sensor manufacturing method may further include forming a concave part on a surface of the first substrate that is exposed from the opening after the opening is formed.

As a result, the space for the thickness of the vibrator portion can be reliably ensured.

As described above, according to the above embodiments, it is possible to provide the angular velocity sensor excellent in the sensitivity characteristics.

Additional features and advantages are described herein, and will be apparent from the following Detailed Description and the figures.

BRIEF DESCRIPTION OF THE FIGURES

FIG. 3 are a schematic side view and a schematic back view of the angular velocity sensor shown in FIG. 1;

FIG. 4 are a process diagram for explaining a method of manufacturing the angular velocity sensor shown in FIG. 1, in which FIG. 4A is a schematic perspective view and FIG. 4B is a main part cross-sectional view, respectively, the figures showing a process of preparing a substrate forming a second layer;

FIG. 5 are a process diagram for explaining a method of manufacturing the angular velocity sensor shown in FIG. 1, in which FIG. 5A is a schematic perspective view and FIG. 5B is a main part cross-sectional view, respectively, the figures showing a process of forming an insulation layer on a surface of the substrate forming the second layer;

FIG. 6 are a process diagram for explaining a method of manufacturing the angular velocity sensor shown in FIG. 1, in which FIG. 6A is a schematic perspective view and FIG. 6B is a main part cross-sectional view, respectively, the figures showing a process of forming an opening portion in the insulation layer;

FIG. 7 are a process diagram for explaining a method of manufacturing the angular velocity sensor shown in FIG. 1, in which FIG. 7A is a schematic perspective view and FIG. 7B is a main part cross-sectional view, respectively, the figures showing a process of bonding a substrate forming a first layer and the substrate forming the second layer with each other;

FIG. 8 are a process diagram for explaining a method of manufacturing the angular velocity sensor shown in FIG. 1, in which FIG. 8A is a schematic perspective view and FIG. 8B is a main part cross-sectional view, respectively, the figures showing a process of bonding the substrate forming the first layer and the substrate forming the second layer with each other;

FIG. 9 are a process diagram for explaining a method of manufacturing the angular velocity sensor shown in FIG. 1, in which FIG. 9A is a schematic perspective view and FIG. 9B is a main part cross-sectional view, respectively, the figures showing a process of forming an insulation layer on a surface of the substrate forming the first layer;

FIG. 10 are a process diagram for explaining a method of manufacturing the angular velocity sensor shown in FIG. 1, in which FIG. 10A is a schematic perspective view and FIG. 10B is a main part cross-sectional view, respectively, the figures showing a process of forming a piezoelectric functional layer on the surface of the substrate forming the first layer;

FIG. 11 are a process diagram for explaining a method of manufacturing the angular velocity sensor shown in FIG. 1, in which FIG. 11A is a schematic perspective view and FIG. 11B is a main part cross-sectional view, respectively, the figures showing a process of processing an outline of a vibrator portion with respect to the substrate forming the first layer;

FIG. 12 are a process diagram for explaining a method of manufacturing the angular velocity sensor shown in FIG. 1, in which

FIG. 13 are a process diagram for explaining a method of manufacturing the angular velocity sensor shown in FIG. 1, in which

FIG. 14 are a process diagram for explaining a method of manufacturing the angular velocity sensor shown in FIG. 1, in which

FIG. 16 are a process diagram for explaining a method of manufacturing the angular velocity sensor shown in FIG. 15, in which

FIG. 17 are a process diagram for explaining a method of manufacturing the angular velocity sensor shown in FIG. 15, in which FIG. 18 are a process diagram for explaining a method of manufacturing the angular velocity sensor shown in FIG. 15, in which

DETAILED DESCRIPTION

The present application will be described with reference to the drawings according to an embodiment.

(First Embodiment)

Figure 1:
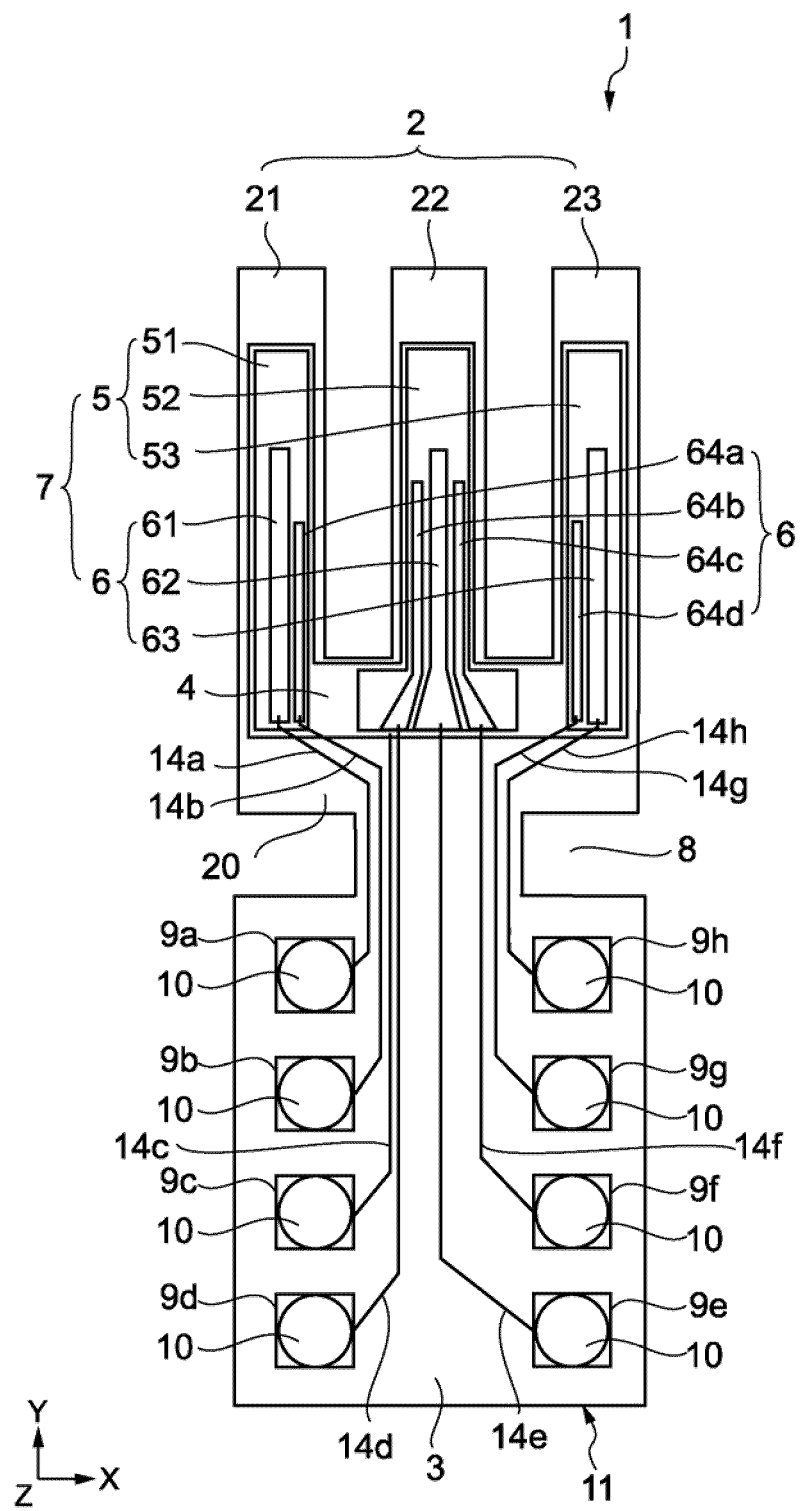
FIG. 1 is a schematic plan view of an angular velocity sensor on a mounting surface side according to a first embodiment.
Figure 2:
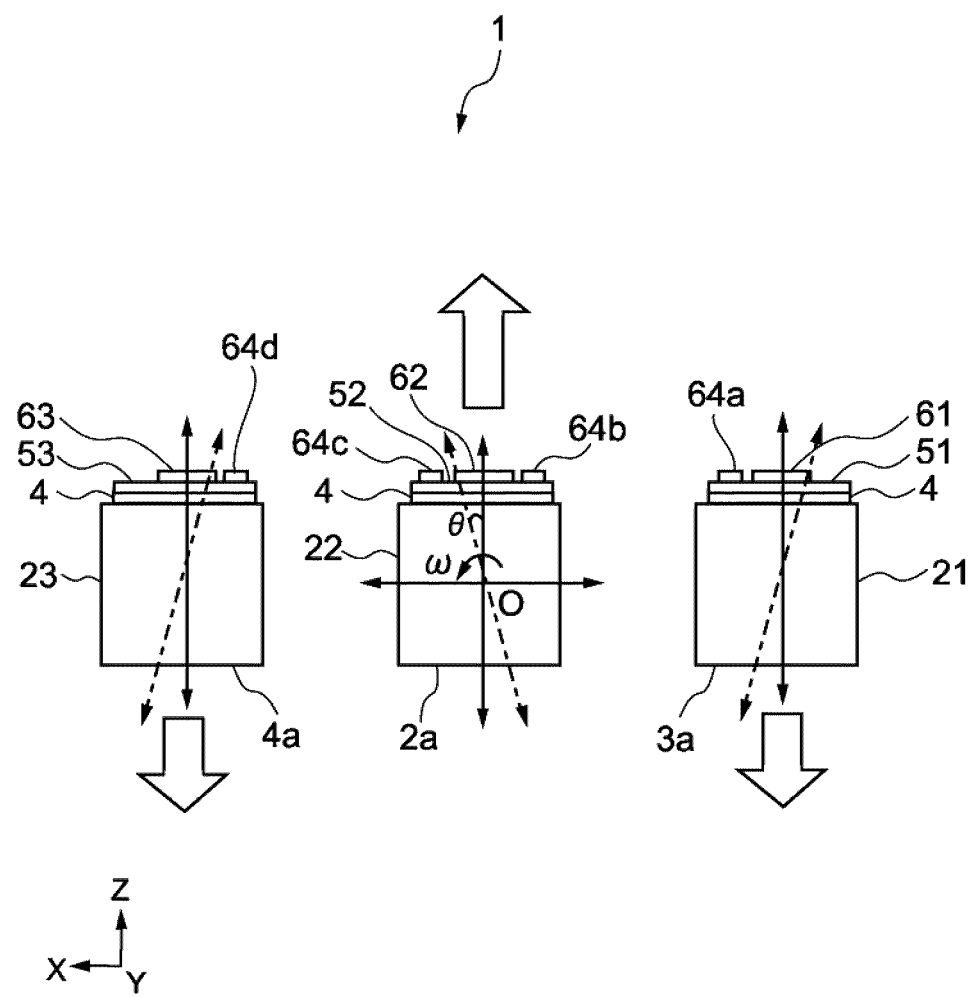
FIG. 2 is a schematic front view of the angular velocity sensor shown in FIG. 1.
Figure 12A:
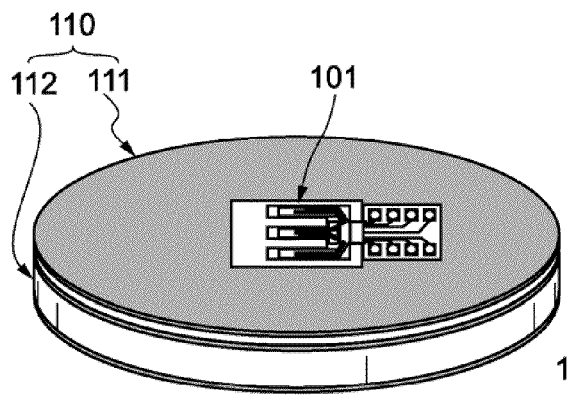
FIG. 12A is a schematic perspective view and FIG. 12B is a main part cross-sectional view, respectively, the figures showing a process of forming a vibration space of the vibrator portion with respect to the substrate forming the first layer.
Figure 12B:
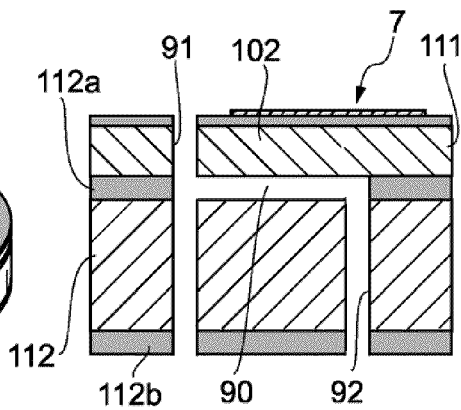
Figure 13A:
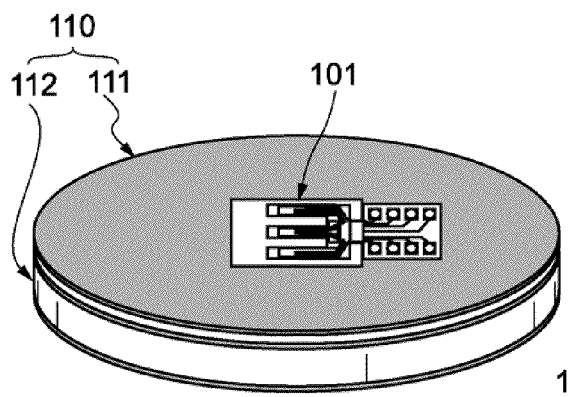
FIG. 13A is a schematic perspective view and FIG. 13B is a main part cross-sectional view, respectively, the figures showing a process of forming the vibration space of the vibrator portion with respect to the substrate forming the first layer.
Figure 13B:
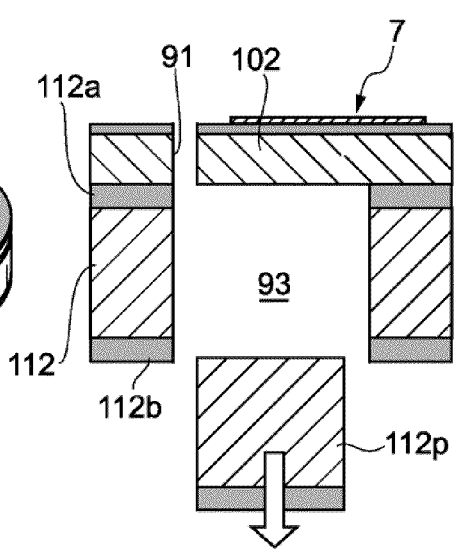
Figure 14A:
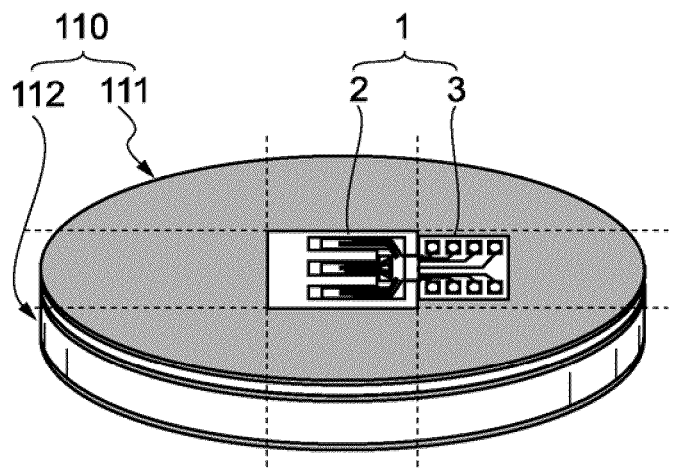
FIG. 14A is a schematic perspective view and FIG. 14B is a main part cross-sectional view, respectively, the figures showing a process of dividing elements into pieces.
Figure 14B:
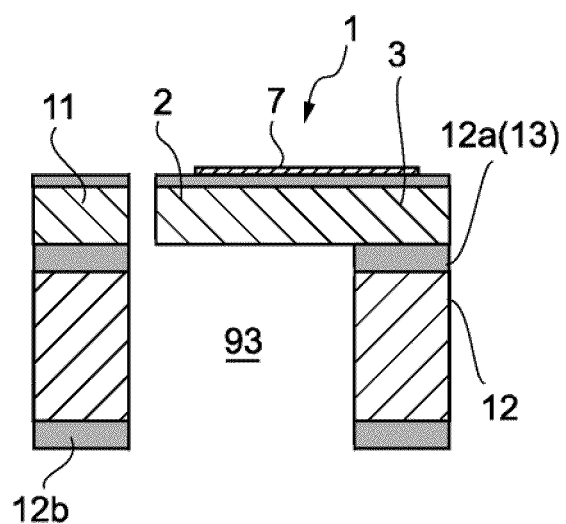

FIG. 1 is a plan view of an angular velocity sensor 1 on a mounting surface side according to a first embodiment. FIG. 2 is a front view of the angular velocity sensor 1. FIG. 3A is a side view of the angular velocity sensor 1. FIG. 3B is a back view of the angular velocity sensor 1. In FIGS. 1 and 2, an X-axis direction indicates a width direction of the angular velocity sensor 1, and a Y-axis direction indicates a longitudinal direction of the angular velocity sensor 1. In addition, a Z-axis direction indicates a thickness direction of the angular velocity sensor 1.

As shown in FIG. 3, the angular velocity sensor 1 has a lamination structure of a base layer 11 (first layer) and a support layer 12 (second layer). As described later, the base layer 11 is structured as an active layer including a vibrator portion 2, and the support layer 12 is structured as a reinforcing layer of the base layer 11.

As shown in FIG. 1, the base layer 11 includes the vibrator portion 2 and a base portion 3 that supports the vibrator portion 2. Between the vibrator portion 2 and the base portion 3, a constriction portion 8 is provided. The constriction portion 8 has a function of preventing a vibration from being transmitted to the base portion 3 when the vibrator portion 2 is activated.

The vibrator portion 2 includes a first arm portion 21, a second arm portion 22, and a third arm portion 23 in the stated order from the left side in FIG. 1, and further includes a connection portion 20 that connects the arm portions 21 to 23. The arm portions 21 to 23 are formed into rectangular parallelepipeds that extend in the Y-axis direction parallel to one another at regular intervals.

The base layer 11 including the vibrator portion 2 and the base portion 3 is formed of a non-piezoelectric substrate. In this embodiment, the base layer 11 is formed of a single-crystalline silicon substrate. The base layer 11 is set to have the same thickness as the vibrator portion 2, for example, 100 μm. The thickness of the base layer 11 is not limited to this, and may be set to 50 μm or more and 200 μm or less, for example. In a case where the angular velocity sensor 1 is formed to have a width and a length as described later, the thickness of the base layer 11 may be set to 90 μm or more and 110 μm or less.

On a surface (first surface) of the vibrator portion 2, a piezoelectric functional layer 7 constituted of multilayers of a lower electrode 4, a piezoelectric layer 5, and an upper electrode 6 is provided. The piezoelectric functional layer 7 is provided on each surface of the first to third arm portions 21 to 23.

Specifically, the first arm portion 21 is provided with a piezoelectric functional layer constituted of the lower electrode 4, a piezoelectric layer 51, and upper electrodes 61 and 64a. The upper electrode 61 functions as a drive electrode for activating the first arm portion 21, and the upper electrode 64a functions as a detection electrode for detecting distortion generated in the first arm portion 21. It should be noted that in the following description, the "upper electrode 61" may also be referred to as a "drive electrode 61", and the "upper electrode 64a" may also be referred to as a "detection electrode 64a".

The second arm portion 22 is provided with a piezoelectric functional layer constituted of the lower electrode 4, a piezoelectric layer 52, and upper electrodes 62, 64b, and, 64c. The upper electrode 62 functions as a drive electrode for activating the second arm portion 22, and the upper electrodes 64b and 64c each function as a detection electrode for detecting distortion generated in the second arm portion 22. It should be noted that in the following description, the "upper electrode 62" may also be referred to as a "drive electrode 62", and the "upper electrode 64b" and "upper electrode 64c" may also be referred to as a "detection electrode 64b" and "detection electrode 64c", respectively.

Further, the third arm portion 23 is provided with a piezoelectric functional layer constituted of the lower electrode 4, a piezoelectric layer 53, and upper electrodes 63 and 64d. The upper electrode 63 functions as a drive electrode for activating the third arm portion 23, and the upper electrode 64d functions as a detection electrode for detecting distortion generated in the third arm portion 23. It should be noted that in the following description, the "upper electrode 63" may also be referred to as a "drive electrode 63", and the "upper electrode 64d" may also be referred to as a "detection electrode 64d".

The lower electrode 4 functions as a common electrode that is commonly provided to the first arm portion 21, the second arm portion 22, and the third arm portion 23. It should be noted that in the following description, the "lower electrode 4" may also be referred to as a "common electrode 4". The common electrode 4 is connected to a predetermined reference potential (ground potential or DC offset potential). The drive electrodes 61 to 63 are connected to a drive signal generation circuit in a controller (not shown). A drive signal is input to the central second arm portion 22 with a phase opposite to that input to the outer first and third arm portions 21 and 23. The detection electrodes 64a to 64d are connected to the drive signal generation circuit (self-oscillation circuit) and an angular velocity detection circuit.

For the piezoelectric layers 51 to 53, for example, PZT that is a mixture of lead, titanium, and zirconium may be used. The common electrode 4 and the upper electrode (drive electrodes 61 to 63 and detection electrodes 64a to 64d) may be constituted of lamination layers of titanium and platinum, for example.

The composition of PZT can be expressed by $Pb_{1+X}(Zr_Y Ti_{1-Y})O_{3+N}$. Specifically, in the composition of the PZT, X can be set to 0 or more and 0.3 or less, and Y can be set to 0 or more and 0.55 or less. In this case, the thickness of the PZT can be set to 400 nm or more and 1000 nm or less.

The three arm portions 21 to 23 are set to have almost the same resonant frequencies in the vertical direction and in the lateral direction, but the resonant frequencies are not limited to those.

In addition, in this embodiment, the central second arm portion 22 includes the drive electrode 62 in a center portion thereof and the pair of detection electrodes 64b and 64c on the both sides thereof, the outer first arm portion 21 includes the drive electrode 61 in a center portion thereof and the detection electrode 64a on one side thereof, and the outer third arm portion 23 includes the drive electrode 63 in a center portion thereof and the detection electrode 64d on one side thereof. Alternatively, the detection electrode may be formed only on the outer arm portions or only on the center arm portion. Similarly, the drive electrode may be formed only on the outer arm portions or only on the center arm portion, instead of forming it on each of the three arm portions.

On the surface of the base portion 3 on the same side where the piezoelectric functional layer 7 is formed, pad portions 9a to 9h and wiring portions 14 (14a to 14h) thereof are formed. The pad portions 9a to 9h are electrically connected to the piezoelectric functional layer 7 on the arm portions 21 to 23 that constitute the vibrator portion 2. The pad portions 9a to 9h constitute terminal portions electrically connected to a wiring substrate (external circuit) (not shown).

Here, the pad portion 9a is connected to the drive electrode 61 of the first arm portion 21 via the wiring portion 14a, and the pad portion 9b is connected to the detection electrode 64a of the first arm portion 21 via the wiring portion 14b. The pad portion 9c is connected to the common electrode 4 via the wiring portion 14c, and the pad portion 9d is connected to the detection electrode 64b of the second arm portion 22 via the wiring portion 14d. The pad portion 9e is connected to the drive electrode 62 of the second arm portion 22 via the wiring portion 14e, and the pad portion 9f is connected to the detection electrode 64c of the second arm portion 22 via the wiring portion 14f. The pad portion 9g is connected to the detection electrode 64d of the third arm portion 23 via the wiring portion 14g, and the pad portion 9h is connected to the drive electrode 63 of the third arm portion 23 via the wiring portion 14h.

The pad portions 9a to 9h each have a bump 10 formed thereon. In this embodiment, the angular velocity sensor 1 is mounted on a wiring substrate (not shown) with a flip chip structure. The bump 10 has a function of electrically and mechanically connecting the angular velocity sensor 1 with the wiring substrate. The bump 10 may be made of an Au bump, a solder bump, or the like. Further, although the bump 10 is formed on the angular velocity 1 side, the formation position is not limited to this. The bump 10 may be formed on the wiring substrate side.

As shown in FIG. 3, the support layer 12 is integrally bonded to the base portion 3 of the base layer 11. The support layer 12 is bonded to a surface (second surface) of the base portion 3, which is a back side of the mounting surface on which the bumps 10 are formed. The support layer 12 is made of a single-crystalline silicon substrate like the base layer 11. A bonding layer 13 is formed between the base layer 11 and the support layer 12. The bonding layer 13 is made of a silicon oxide layer.

The support layer 12 is formed to be thicker than the base layer 11. Specifically, the support layer 12 is formed so as to have the thickness sufficient to impart the thinner base layer 11 a predetermined mechanical strength when the angular velocity sensor 1 is manufactured. For example, in a case where the thickness of the base layer 11 is 100 μm, the thickness (dimension in the Z direction) of the support layer 12 can be set to 300 μm. The thickness of the support layer 12 is not limited to the above-mentioned example. The thickness of the support layer 12 may be set to 200 μm or more and 400

μm or less, and can be set depending on the shape, size, or the like of an element (angular velocity sensor) as appropriate.

The width (dimension in the X direction) and the length (dimension in the Y direction) of the support layer 12 can be changed as appropriate. In this embodiment, the width and length of the support layer 12 are set to be the same as the width and length of the base portion 3, and the second surface of the base layer 11 that corresponds to the entire formation area of the base portion 3 is covered with the support layer 12.

With the structure of the support layer 12 as described above, the support layer 12 is bonded to the second surface of the base portion 3 over the area including the positions where the pad portions 9a to 9h are formed on the base portion 3. In this case, a reinforcement function for the base portion 3 by the support layer 12 can be obtained. Accordingly, the base portion 3 is prevented from being damaged by a pressing force of the angular velocity sensor 1 against the external circuit when the angular velocity sensor 1 is mounted on the external circuit (wiring substrate) by using a mounting jig (mounter).

The sizes of the respective portions of the angular velocity sensor 1 are as follows. The thickness of each of the arm portions 21 to 23 is set to 100 μm, the thickness of the base portion 3 and the support layer 12 is set to 400 μm in total, the length of the element (entire length) is set to 3 mm, the width of the element is set to 0.5 mm, the length of each of the arm portions 21 to 23 are set to 1.8 to 1.9 mm, and the width of each of the arm portions 21 to 23 are set to 100 μm.

Next, a typical operation example of the angular velocity sensor 1 structured as described above will be described.

When a drive signal is input to the drive electrodes 61 to 63, the first to third arm portions 21 to 23 vibrate in the Z-axis direction in FIG. 2. As described above, the opposite-phase drive signals are input to the central arm portion 22 and to the outer arm portions 21 and 23. Accordingly, as shown in FIG. 2, the central arm portion 22 and the outer arm portions 21 and 23 vibrate with the opposite phases. At this time, when the second arm portion 22 vibrates at twice the amplitude of the first and third arm portions 21 and 23, unnecessary vibration is degenerated, with the result that a stable vibration mode can be obtained.

As shown in FIG. 2, when an angular velocity ω is applied around an axis direction (Y-axis direction) of the vibrator portion 2, the Coriolis force acts with respect to the arm portions 21 to 23, and a component that vibrates in a direction (X-axis direction) parallel to the formation surface of the piezoelectric functional layer 7 is generated. The angular velocity sensor 1 detects the vibration component by using the detection electrodes 64a to 64d, and outputs to the controller (not shown) the component as an angular velocity signal. The controller calculates the angular velocity based on the angular velocity signal input.

In the angular velocity sensor 1 in this embodiment, the support layer 12 has the function of supporting the base layer 11. Accordingly, the base layer 11 can be formed of the relatively thin substrate, for example, the substrate as thick as the vibrator portion 2. With this structure, the angular velocity sensor which is excellent in the sensitivity characteristics and in which the thickness of the vibrator portion 2 does not depend on the in-plane position of the substrate can be obtained.

In addition, in the angular velocity sensor 1 according to this embodiment, the mechanical strength of the base layer 11 can be enhanced by the support layer 12. Therefore, the base layer 11 can be prevented from being damaged in the mounting process of the angular velocity sensor 1 or in actual use thereof, and highly reliable angular velocity detection can be ensured.

Hereinafter, a manufacturing method of the angular velocity sensor 1 according to this embodiment will be described in detail with reference to FIGS. 4 to 14. Here, FIGS. 4A, 5A, 6A, 7A, 8A, 9A, 10A, 11A, 12A, 13A, and 14A each are a perspective view of the substrate, and FIGS. 4B, 5B, 6B, 7B, 8B, 9B, 10B, 11B, 12B, 13B, and 14B each are a cross-sectional view of the substrate.

First, as shown in FIG. 4, a substrate 112 (first substrate or second substrate) that constitutes the support layer 12 is prepared. As the substrate 112, a single-crystalline silicon substrate having a thickness of 300 μm is used, for example.

Next, as shown in FIG. 5, by performing a heating process in an oxygen atmosphere, thermally-oxidized layers 112a and 112b are formed on entire surfaces of the substrate 112. Thus, an insulation layer can be easily formed on the surfaces of the substrate 112. It should be noted that, in the figures, a state where the thermally-oxidized layers are formed on a front surface and a back surface of the substrate 112 is shown, but in actuality, a thermally-oxidized layer is formed on a side surface of the substrate similarly.

The thermally-oxidized layers 112a and 112b (insulation layers) each are a silicon oxide layer ($SiO_2$ layer). The thickness of each of the thermally-oxidized layers 112a and 112b can be set to about 1 μm, for example, but is not limited to this. The thickness may be set to 0.1 μm or more and 3 μm or less. It should be noted that the method of forming the oxide layer is not limited the thermal oxidization method described above. For example, the oxide layer can be formed of a plasma TEOS layer or a chemical vapor deposition layer formed by CVD or the like. By forming the oxide layer by the thermal oxidization method, the oxide layer excellent in layer quality such as crystallinity, and a stable bonding operation can be obtained in a substrate bonding process described later.

Subsequently, as shown in FIG. 6, an opening 90 from which the surface of the substrate 112 is partly exposed is formed in the thermally-oxidized layer 112a formed on one surface of the substrate 112.

As a formation method of the opening 90, the known photolithography technique may be used. Specifically, a photo-resist film is formed on the surface of the thermally-oxidized layer 112a, and then the photo-resist film is exposed through a mask having a shape pattern of the opening 90. After that, the photo-resist film is developed, thereby forming a resist pattern corresponding to the shape pattern of the opening 90. Subsequently, the substrate 112 is immersed in appropriate chemicals such as ammonium fluoride, and the thermally-oxidized layer 112a positioned at the opening of the resist pattern is etched to be removed.

It should be noted that, for ease of explanation and understanding, a state where only one opening 90 is formed in the substrate 112 is shown. However, in a case where a plurality of (for example, several tens to several hundreds of) sensors are manufactured from one substrate at the same time, a plurality of openings 90 are formed in the substrate 112.

Next, as shown in FIG. 7, a substrate 111 (second substrate or first substrate) that constitutes the base layer 11 is prepared. As the substrate 111, for example, a mono-crystalline silicon substrate having a thickness of 100 μm, which is the same as that of the vibrator portion 2, is used. The size of the substrate 111 is approximately the same as that of the substrate 112.

Then, as shown in FIG. 8, the substrate 111 and the substrate 112 are bonded while sandwiching the thermally-oxidized layer 112a. Further, the substrate 111 and the substrate 112 are integrally bonded with each other, and therefore can be handled as a single substrate (SOI substrate 110) in subsequent processes. Here, the thermally-oxidized layer 112a functions as the bonding layer 13 that bonds the base layer 11 and the support layer 12 in the angular velocity sensor 1.

For bonding the substrates 111 and 112, a substrate bonding technique that is typical in an SOI technique may be used. Specifically, a solid-phase boding by atom diffusion using a heat/pressure application technique may be used. In addition, an anodic bonding in which the substrates 111 and 112 are bonded by applying a voltage may also be used. Further, an adhesive bonding using an adhesive may also be used.

Subsequently, as shown in FIG. 9, by performing the heating process in the oxygen atmosphere, a thermally-oxidized layer 111a is formed on an entire surface of the substrate 111. The surface of the substrate 111 on which the thermally-oxidized layer 111a is formed corresponds to a main surface (surface other than a side surface) of the SOI substrate 110 on which the piezoelectric functional layer 7 is to be formed. It should be noted that, in the figures, the state where the thermally-oxidized layer is formed on the surface of the substrate 111 is illustrated, but in actuality, a similar thermally-oxidized layer is also formed on the side surface of the substrate.

The thermally-oxidized layer 111a (insulation layer) is a silicon oxide layer ($SiO_2$ layer). The thickness of the thermally-oxidized layer 111a is not particularly limited and may be set to about 1 μm, for example. But, the thickness is not limited to this and may instead be set to 0.1 μm or more and 3 μm or less. It should be noted that the formation method of the oxide layer is not limited to the above-mentioned thermal oxidation method. For example, the oxide layer can be formed of a plasma TEOS layer or a chemical vapor deposition layer formed by CVD or the like. By forming the oxide layer by the thermal oxidation method, the oxide layer excellent in layer quality such as crystallinity can be obtained.

Next, as shown in FIG. 10, on the substrate 111, the above-mentioned piezoelectric functional layer 7, the pad portions 9a to 9h, the bump 10, the wiring portions 14a to 14h, and the like are formed via the thermally-oxidized layer 111a.

At this time, an element formation area is set so that a vibrator portion and a constriction portion of an angular velocity sensor are disposed in an area on the substrate 111 that corresponds to the formation position of the opening 90 on the substrate 112 and so that a base portion of the angular velocity sensor is disposed in an area on the substrate 111 that corresponds to the formation position of the thermally-oxidized layer 112a. It should be noted that in the figures, reference numeral 101 denotes the angular velocity sensor in a state of a wafer prior to division into pieces, reference numeral 102 denotes a vibrator portion of the angular velocity sensor 101, and reference numeral 103 denotes a base portion of the angular velocity sensor 101.

For forming the piezoelectric functional layer 7, an electrode film constituting the common electrode 4 and electrode films constituting the piezoelectric layer 5 and the upper electrode 6 are formed on the thermally-oxidized layer 111a as appropriate by a thin film formation method such as a sputtering method. In addition, a shape pattern of each of the arm portions 21 to 23 of the vibrator portion is formed by the photolithography technique, and an etching process is repeatedly performed as appropriate. In this way, the piezoelectric functional layer 7 shown in FIG. 1 can be formed.

Subsequently, as shown in FIG. 11, dry etching is performed on an area of the substrate 111 that corresponds to the formation position of the opening 90, thereby forming an etching groove 91 that corresponds to an outline of the vibrator portion 102. The etching groove 91 penetrates the substrate 111 in the thickness direction. Thus, the vibrator portion 102 is formed immediately above the opening 90.

As a method of forming the etching groove 91, a silicon deep etching technique such as a Deep RIE (Reactive Ion Etching) may be used. In this technique, an etching process and a deposition process are alternately performed repeatedly, thereby advancing etching while forming a protective layer on a side wall portion of an etching pattern. With this technique, anisotropic etching that advances the etching in the thickness direction of the substrate can be realized. Herein, $SF_6$ may be used for an etching gas, and $C_4F_8$ may be used for a deposition gas. It should be noted that when the etching groove 91 is formed, the formation area of the vibrator portion 102 and the base portion 103 are covered with a protective film such as a resist.

Next, as shown in FIGS. 12 and 13, a through hole 93 through which the vibrator portion 102 is exposed from the opening 90 is formed in the substrate 112.

When the process shown in FIG. 11 is completed, the vibrator portion 102 is independently formed. Therefore, the vibrator portion 102 can be vibrated with respect to the base portion 103 without forming the through hole 93. However, allowable amplitude of the vibrator portion 102 is limited to a value corresponding to the thickness of the thermally-oxidized layer 112a. Accordingly, free vibration of the vibrator portion 102 may not be ensured depending on the thickness of the thermally-oxidized layer 112a. In view of this, in this embodiment, the through hole 93 is formed in order to provide a sufficient space below the vibrator portion 102 as described later in detail. It should be noted that the following processes can be omitted if the thermally-oxidized layer has a sufficient thickness.

As shown in FIG. 12, in the formation process of the through hole 93, an etching groove 92 is annularly formed in the substrate 112 by the dry etching process so as to correspond to the outline of the opening 90. With this structure, as shown in FIG. 13, a block portion 112p of the substrate 112, which is located inside the etching groove 92, is brought into discontinuousness from the main body portion of the substrate 112 and is separated therefrom. In addition, the formation area of the block portion 112p is separated from the substrate 111 by forming the opening 90.

Accordingly, by forming the etching groove 92, the through hole 93 can be easily formed. Further, the area to be etched can be reduced as compared to a case where the formation area of the through hole 93 is entirely etched and removed, which makes it possible to efficiently form the through hole 93. Furthermore, if the area to be etched is large, supply of the etching gas is not in time, or a bias energy used for irradiating the substrate with ions by converting gas components into plasma is dispersed, with the result that the etching efficiency may be undesirably degraded. However, in this embodiment, such concern as described above can be overcome.

After the through hole 93 is formed, the SOI substrate 110 is diced, thereby forming the independent angular velocity sensors 1 into pieces as shown in FIG. 14. Dicing lines are corresponded to the outline of the base portion 3 of the angular velocity sensor 1. The outline of the vibrator portion 2 is defined by the etching groove 91, and therefore the angular velocity sensor 1 shown in FIG. 1 is manufactured by the dicing process.

As described above, in this embodiment, the substrate 112 functions as the support layer that supports the substrate 111. As a result, the handling ability of the substrate 111 having the same thickness as the vibrator portion 2 is improved, and the substrate 111 can be prevented from cracking.

According to this embodiment, the outline of the vibrator portion 2 is defined by the dry etching process only, without using a wet etching process with respect to the substrate 111. Therefore, etching accuracy can be improved, and uniformity of the in-plane etching rate on the substrate is also improved. Thus, the angular velocity sensor 1 which is excellent in the sensitivity characteristics and in which the thickness of the vibrator portion 2 does not depend on the in-plane position of the substrate can be obtained. In addition, the vibration space of the vibrator portion can be ensured within the opening of the insulation layer. Therefore, the vibration space can be formed without directly exposing the vibrator to the etching solution, and the piezoelectric layer can be prevented from being adversely affected due to the use of the etching solution.

According to this embodiment, the thickness of the vibrator portion 2 can be determined as the thickness of the material used first (substrate 111), so the thickness of the vibrator portion is not required to be adjusted by performing machining. It should be noted that after the SOI substrate 110 is manufactured, by polishing the main surface of the substrate 111 by a predetermined amount, the thickness of the substrate 111 can be adjusted to be the thickness of the vibrator portion 2. In this case, the substrate 112 functions as the support layer of the substrate 111, and thus the handling ability and workability of the substrate 111 in the polishing process can be improved.

Further, according to this embodiment, a degree of freedom is obtained for selection of plane direction of the substrate 111 on which the vibrator portion 2 is formed, so the strength of the vibrator portion can be improved.

In other words, in the past technique in which a silicon substrate is subjected to wet etching and a vibration space of a vibrator is formed, etching characteristics largely depend on the plane direction of the silicon substrate. Accordingly, a formation area of the vibrator is severely limited. Meanwhile, it is known that a cleavage plane (plain orientation (110), (111)) of a silicon substrate is likely to be fractured. Therefore, if the cleavage plane exists at a portion where a stress is focused, such as the constriction portion of the vibrator, the strength of the portion is reduced, which may cause the angular velocity sensor to be fractured due to a slight impact.

In contrast, in this embodiment, the substrate 111 on which the vibrator portion 2 is formed and the substrate 112 in which the vibration space of the vibrator portion 2 is formed are formed of separate substrates. Therefore, it is possible to obtain a high degree of freedom for selection of the plane direction of the substrate 111 on which the vibrator 2 is formed. Accordingly, by appropriately determining the plane direction of the substrate 111, a fracture strength of the vibrator portion 2 can be improved and durability of the angular velocity sensor can be improved. Specifically, the plane direction of the substrate 111 or the vibrator portion 2 can be selected so that the outer surface of the constriction portion 8 of the vibrator portion 2 crosses the cleavage plane of the silicon substrate.

(Second Embodiment)

Figure 15A:
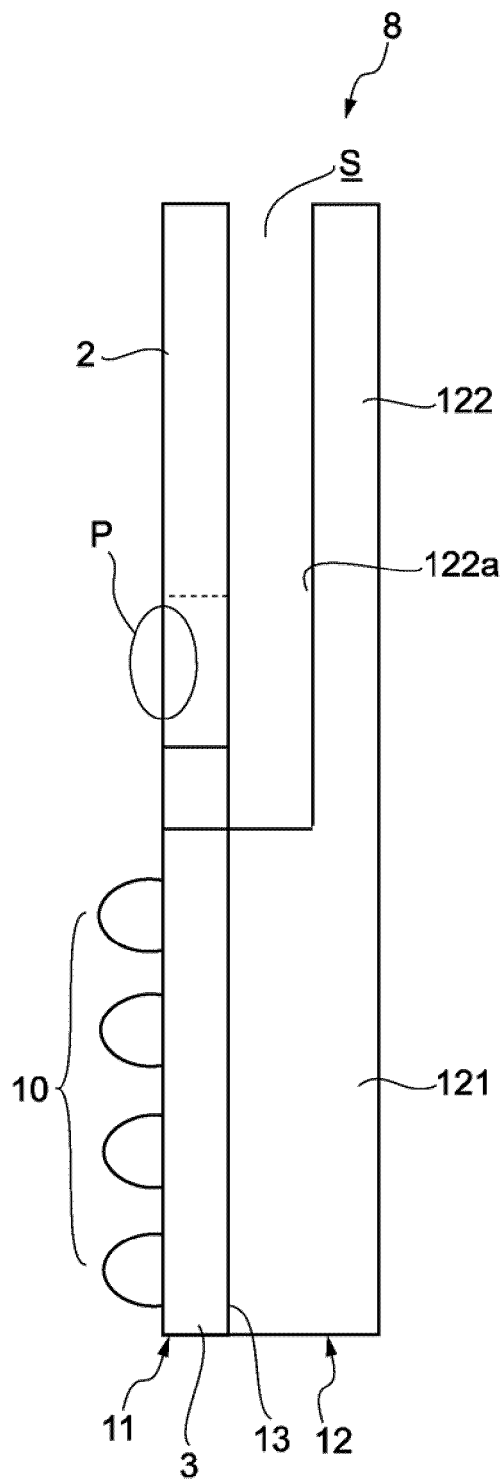
FIG. 15 are a schematic side view and an enlarged cross-sectional view of a main part of an angular velocity sensor according to a second embodiment.
Figure 15B:
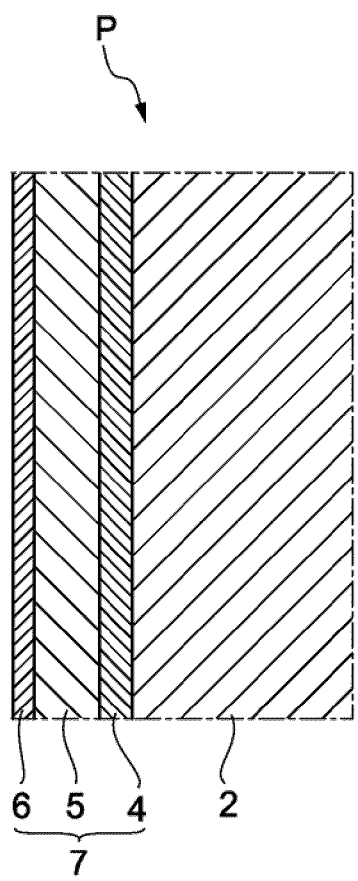

FIG. 15A is a side view of an angular velocity sensor 81 according to a second embodiment. It should be noted that portions corresponding to those of the first embodiment are represented by the same reference numerals or symbols in the figure, and detailed descriptions thereof will be omitted. FIG. 15B is an enlarged cross-sectional view of a P part of the angular velocity sensor 81 shown in FIG. 15A.

The angular velocity sensor 81 according to this embodiment has the same structure as that of the first embodiment in that the angular velocity sensor 81 has the bonded structure of the support layer 12 (second layer) and the base layer 11 (first layer) including the vibrator portion 2 and the base portion 3. But, this embodiment is different from the first embodiment in that the support layer 12 includes a main body portion 121 bonded to the base portion 3 and a shielding portion 122 that shields the vibrator portion 2.

The shielding portion 122 is formed into a plate shape that extends from one end of the main body portion 121 in parallel to the vibrator portion 2. The shielding portion 122 has the same length as the vibrator portion 2, but the length is not of course limited to this. Further, the shielding portion 122 has a concave part 122a on a surface opposed to the vibrator portion 2. The concave part 122a forms a vibration space S of the vibrator portion 2. With this structure, at the time when the vibrator portion 2 vibrates, an interference with the shielding portion 122 can be prevented, and therefore the free vibration of the vibrator portion 2 is ensured.

In the angular velocity sensor 81 having the above-mentioned structure, the base layer 12 has the shielding portion 122 that shields the vibrator portion 2. Therefore, for example, when the angular velocity sensor 81 is handled on an element basis or when the angular velocity sensor 81 is mounted on the wiring substrate, the vibrator portion 2 can be prevented from being accidentally fractured. Thus, the vibrator portion 2 can be protected.

Figures 17A, 17B:
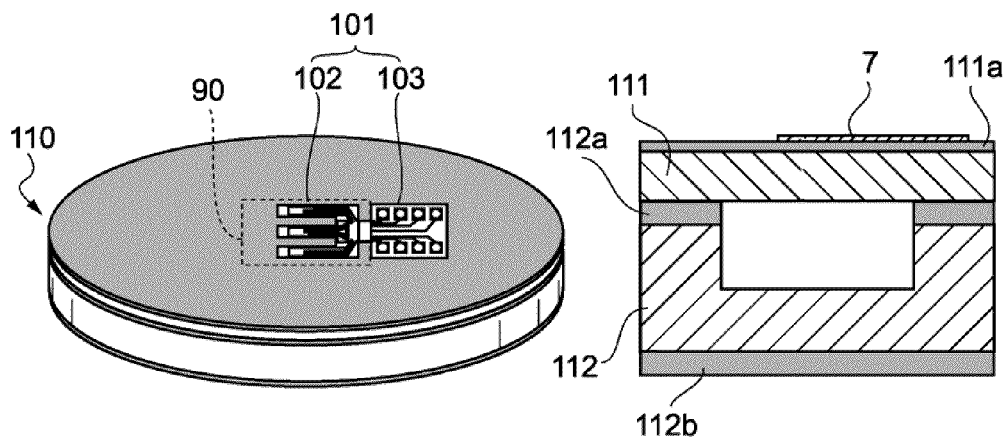
FIG. 17A is a schematic perspective view and FIG. 17B is a main part cross-sectional view, respectively, the figures showing a process of bonding the substrate forming the first layer and the substrate forming the second layer with each other.
Figures 18A, 18B:
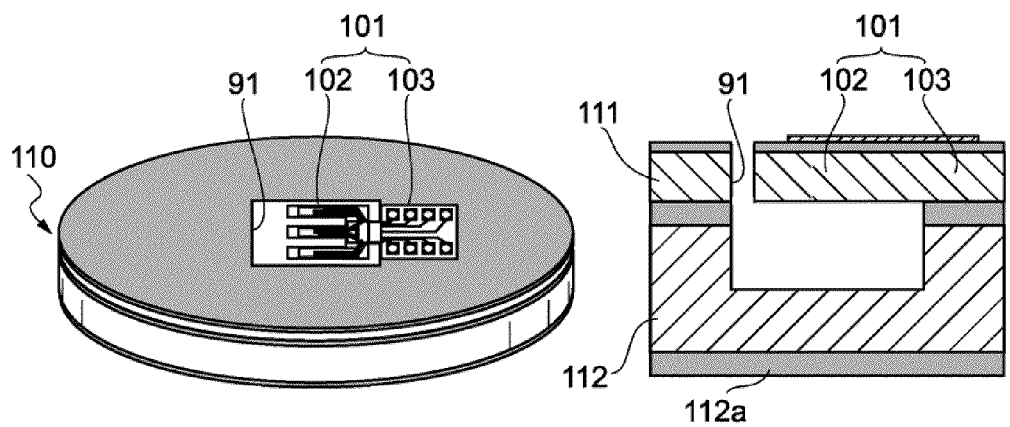
FIG. 18A is a schematic perspective view and FIG. 18B is a main part cross-sectional view, respectively, the figures showing a process of processing an outline of a vibrator portion with respect to the substrate forming the first layer.

Next, With reference to FIGS. 16 to 18, a method of manufacturing the angular velocity sensor 81 according to this embodiment will be described. Here, FIGS. 16A, 17A, and 18A each are a perspective view of the substrate, and FIGS. 16B, 17B, and 18B each are a cross-sectional view of the substrate.

Figures 16A, 16B:
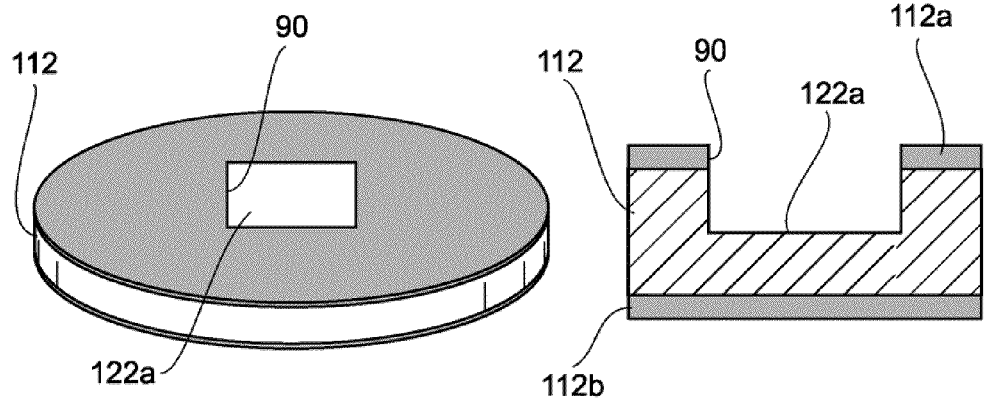
FIG. 16A is a schematic perspective view and FIG. 16B is a main part cross-sectional view, respectively, the figures showing a process of forming an insulation layer on the surface of the substrate forming the second layer and a process of forming a concave part with respect to the substrate.

FIG. 16 show a process of forming the opening 90 for the thermally-oxidized layer 112a formed on the surface of the substrate 112. In this process, after the opening 90 is formed, the dry etching (RIE) is performed with the thermally-oxidized layer 112a being a mask as shown in FIG. 16B. By this process, the concave part 122a is formed in the surface of the substrate 112 exposed from the opening 90. It should be noted that the formation process of the opening 90 is the same as that in the first embodiment, so a description of the process will be omitted.

The concave part 122a can be formed by performing half etching on the substrate 122. A depth of the concave part 122a can be appropriately set to, e.g., 100 μm, which is nearly double the vibration amplitude of the end of the vibrator portion 2 (arm portions 21 to 23). The depth of the concave part 122a is not limited to the above example, and may be set to 30 μm or more and 150 μm or less.

Subsequently, as shown in FIG. 17, the substrate 111 is bonded to the substrate 112, and the piezoelectric functional layer 7 is formed on the substrate 111. It should be noted that the bonding process of the substrates and the formation process of the piezoelectric functional layer are the same as those in the first embodiment, so their descriptions will be omitted.

Next, as shown in FIG. 18, the etching groove 91 is formed in the substrate 111 by the dry etching process, thereby defining the outline of the vibrator portion 102. After that, the dicing process is carried out, thereby manufacturing the angular velocity sensor 81. It should be noted that the formation process of the etching groove 91, the dicing process, and the like are the same as those in the first embodiment, so their descriptions will be omitted.

As described above, according to this embodiment, the same effect as the first embodiment can be obtained. In particular, according to this embodiment, the vibration space S of the vibrator portion 102 can be formed without forming a through hole in the substrate 112. Because the vibration space S is structured by the concave part 122a and the concave part 122a is formed by the half etching, the angular velocity sensor 81 can be manufactured while preventing a process time from being increased and realizing high yield.

For example, in the above embodiments, the three-axis tuning-fork angular velocity sensor including the vibrator portion 2 constituted of the three arm portions 21 to 23 is described as an example. The present application can also be applied to an angular velocity sensor of another type that includes a vibrator portion constituted of one or two arm portions.

Further, in the above embodiments, the example in which the insulation layer 112a is formed on the surface of the substrate 112 that forms the support layer 12. Alternatively, the insulation layer may be formed on the substrate 111 forming the vibrator portion 2. In this case, the substrate 111 and the substrate 112 are bonded with each other while sandwiching the insulation layer.

Furthermore, the main surface that is the surface on which the vibrator portion is formed in the bonding substrate (SOI substrate) may be a main surface on the substrate side on which the insulation layer as the bonding layer is formed or may be a main surface on the substrate side on which the insulation layer is not formed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An angular velocity sensor, comprising:
  a first layer having a first main surface and a second main surface, the first layer including a vibrator portion, which includes a first arm portion, a second arm portion, and a third arm portion that extend in parallel to one another, and a base portion that supports the vibrator portion;
  a piezoelectric functional layer formed on the first main surface of the first layer, the piezoelectric functional layer including a piezoelectric layer formed between a lower electrode and a plurality of upper electrodes, the lower electrode formed between the piezoelectric layer and the first main surface; and
  a second layer integrally bonded to the base portion on a side of the second main surface of the first layer,
  wherein the plurality of upper electrodes includes a plurality of drive electrodes and a plurality of corresponding detection electrodes, and the first arm portion and the second arm portion vibrate at a first amplitude in a first phase, and the third arm portion located between the first arm portion and the second arm portion vibrates at a second amplitude, which is twice the first amplitude, and each of the first arm portion, the second arm portion, and the third arm portion include at least one of the drive electrodes extending in a longitudinal direction alongside at least one of the corresponding detection electrodes.

2. The angular velocity sensor according to claim 1, wherein the second layer is thicker than the first layer.

3. The angular velocity sensor according to claim 2, wherein the first layer has the same thickness as the vibrator portion.

4. The angular velocity sensor according to claim 3, wherein the first layer and the second layer each are made of a silicon substrate, the angular velocity sensor further comprising:
  a bonding layer made of a silicon oxide layer between the first layer and the second layer.

5. The angular velocity sensor according to claim 4, further comprising:
  a plurality of terminal portions that are formed on the base portion on a side of the first main surface and connected to an external circuit,
  wherein the second layer is bonded to the second main surface over an area corresponding to formation positions of the plurality of terminal portions.

6. The angular velocity sensor according to claim 5,
  wherein the second layer includes a shielding portion that shields the vibrator portion, and
  wherein the shielding portion includes, on a surface opposed to the vibrator portion, a concave part in which a vibration space of the vibrator portion is formed.

7. An angular velocity sensor manufacturing method, comprising:
  forming an insulation layer on a first substrate;
  forming, on the insulation layer, an opening from which the first substrate is exposed;
  bonding a second substrate to the first substrate with the insulation layer being sandwiched;
  forming a piezoelectric functional layer on a main surface of one of the first substrate and the second substrate, the piezoelectric functional layer including a piezoelectric layer formed between a lower electrode and a plurality of upper electrodes, the lower electrode formed between the piezoelectric layer and the main surface, the plurality of upper electrodes includes a plurality of drive electrodes and a plurality of corresponding detection electrodes;
  forming a vibrator portion, which includes a first arm portion, a second arm portion, and a third arm portion that extend in parallel to one another, in an area on the main surface which corresponds to a formation position of the opening, the first arm portion and the second arm portion formed to vibrate at a first amplitude in a first phase, and the third arm portion located between the first arm portion and the second arm portion formed to vibrate at a second amplitude, which is twice the first amplitude, and each of the first arm portion, the second arm portion, and the third arm portion include at least one of the drive electrodes extending in a longitudinal direction alongside at least one of the corresponding detection electrodes; and
  forming an outline of a base portion that supports the vibrator portion by dicing the first substrate and the second substrate.

8. The angular velocity sensor manufacturing method according to claim 7,
  wherein the second substrate is thinner than the first substrate, and
  wherein the main surface is a main surface of the second substrate.

9. The angular velocity sensor manufacturing method according to claim 8,
  wherein the step of forming the insulation layer includes forming a silicon oxide layer on the first substrate by performing a heating process on the first substrate as a silicon substrate in an oxygen atmosphere.

10. The angular velocity sensor manufacturing method according to claim 9, wherein the step of forming the vibrator portion includes forming, in the second substrate, an etching groove that corresponds to an outline of the vibrator portion by a dry etching process.

11. The angular velocity sensor manufacturing method according to claim 10, further comprising:
forming, in the first substrate, a through hole through which the vibrator portion is exposed to outside from the opening.

12. The angular velocity sensor manufacturing method according to claim 11,
wherein the step of forming the through hole includes forming, in the first substrate, an etching groove that corresponds to an outline of the opening by the dry etching process.

13. The angular velocity sensor manufacturing method according to claim 10, wherein the etching groove is formed without using a wet etching process.

14. The angular velocity sensor manufacturing method according to claim 8, further comprising:
forming a concave part on a surface of the first substrate that is exposed from the opening after the opening is formed.

15. The angular velocity sensor manufacturing method according to claim 8, further comprising:
polishing the main surface by a predetermined amount before the piezoelectric layer is formed.

16. An angular velocity sensor, comprising:
a first layer made of a silicon substrate having a first main surface and a second main surface opposed to the first main surface, the first layer including a vibrator portion, which includes a first arm portion, a second arm portion, and a third arm portion that extend in parallel to one another, and a base portion that supports the vibrator portion, and having the same thickness as the vibrator portion, the first main surface being formed with a thermally-oxidized layer thereon;
a piezoelectric functional layer in which a lower electrode, a piezoelectric layer and a plurality of upper electrodes are stacked in order formed on the thermally-oxidized layer of the vibrator portion;
a plurality of terminal portions that are formed on the base portion on a side of the first main surface to mechanically and electrically connect the piezoelectric functional layer to a wiring substrate;
a second layer bonded to an area of the base portion including the formation position of the terminal portions on a side of the second main surface so as to expose the vibrator portion, the second layer being thicker than the first layer and made of a silicon substrate; and
a bonding layer formed between the first layer and the second layer and made of a silicon oxide layer integrally bonding the first layer and the second layer,
wherein the plurality of upper electrodes includes a plurality of drive electrodes and a plurality of corresponding detection electrodes, and the first arm portion and the second arm portion vibrate at a first amplitude in a first phase, and the third arm portion located between the first arm portion and the second arm portion vibrates at a second amplitude, which is twice the first amplitude, and each of the first arm portion, the second arm portion, and the third arm portion include at leastone of the drive electrodes extending in a longitudinal direction alongside at least one of the corresponding detection electrodes.

* * * * *